April 26, 1938.	H. W. L. NOACK	2,115,558
FLUID PRESSURE BRAKE SYSTEM
Filed Feb. 24, 1936	3 Sheets-Sheet 1
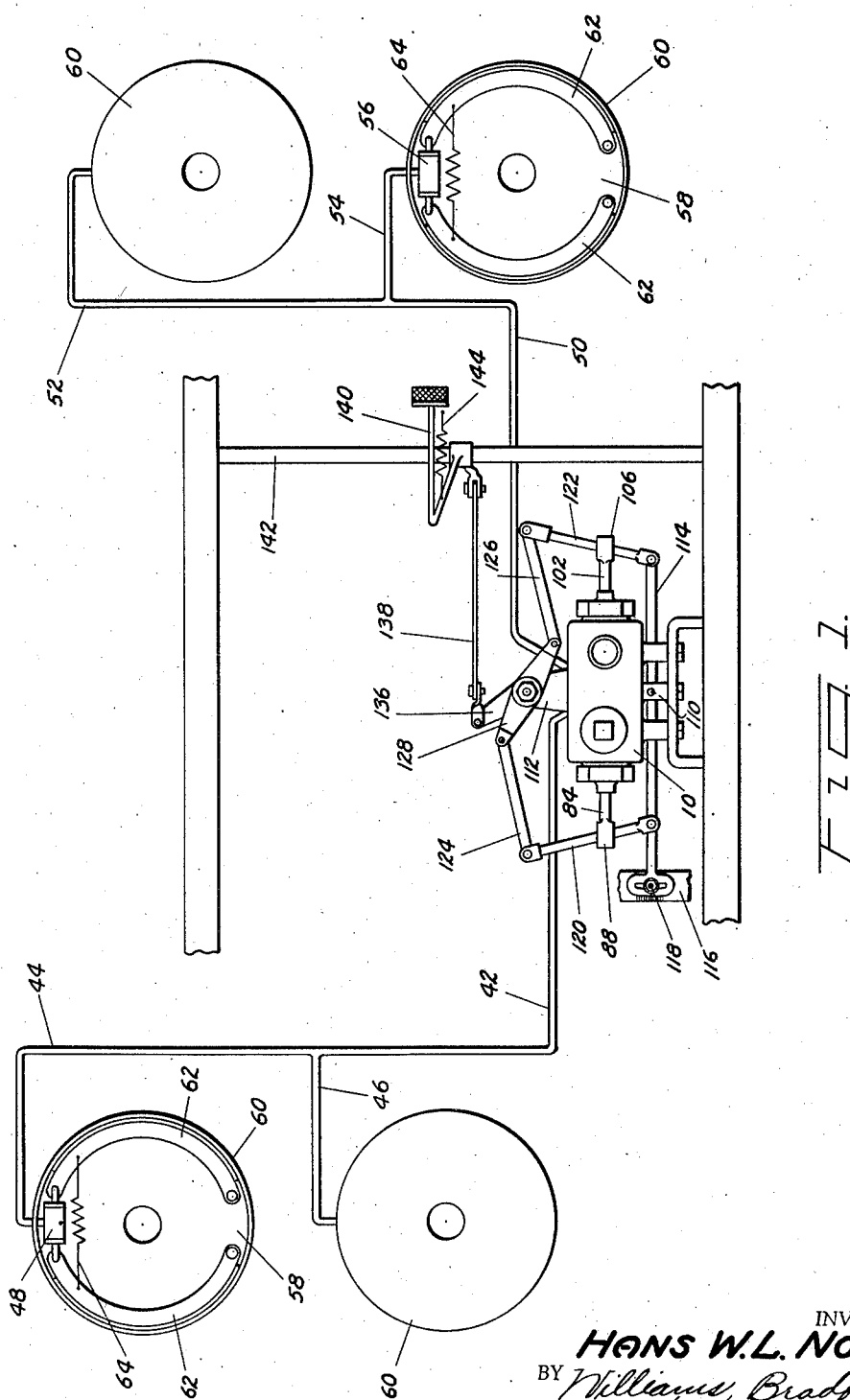
INVENTOR.
HANS W. L. NOACK
BY Williams, Bradbury,
McCaleb & Hinkle
ATTORNEYS.

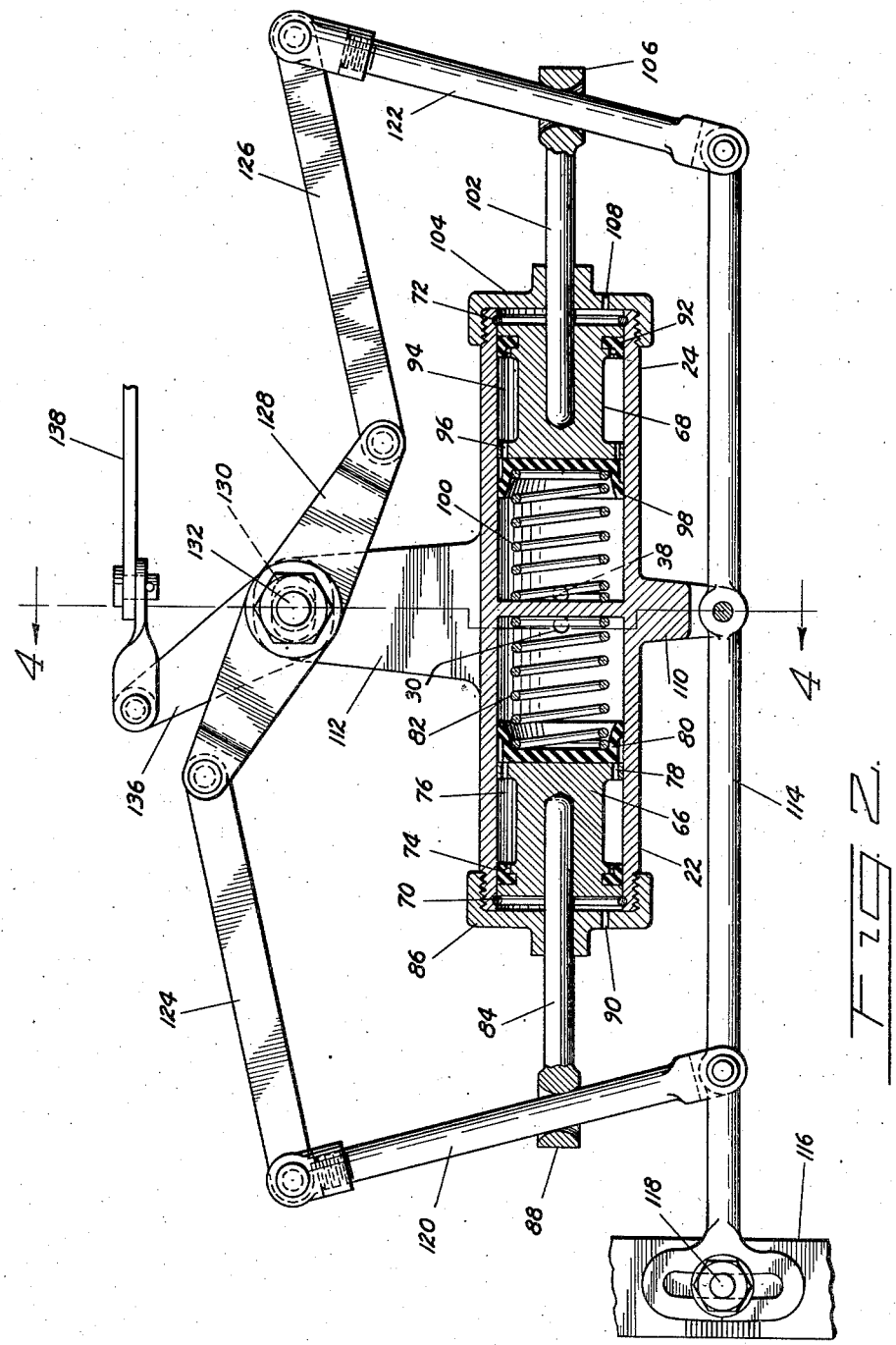

April 26, 1938.   H. W. L. NOACK   2,115,558
FLUID PRESSURE BRAKE SYSTEM
Filed Feb. 24, 1936   3 Sheets-Sheet 3
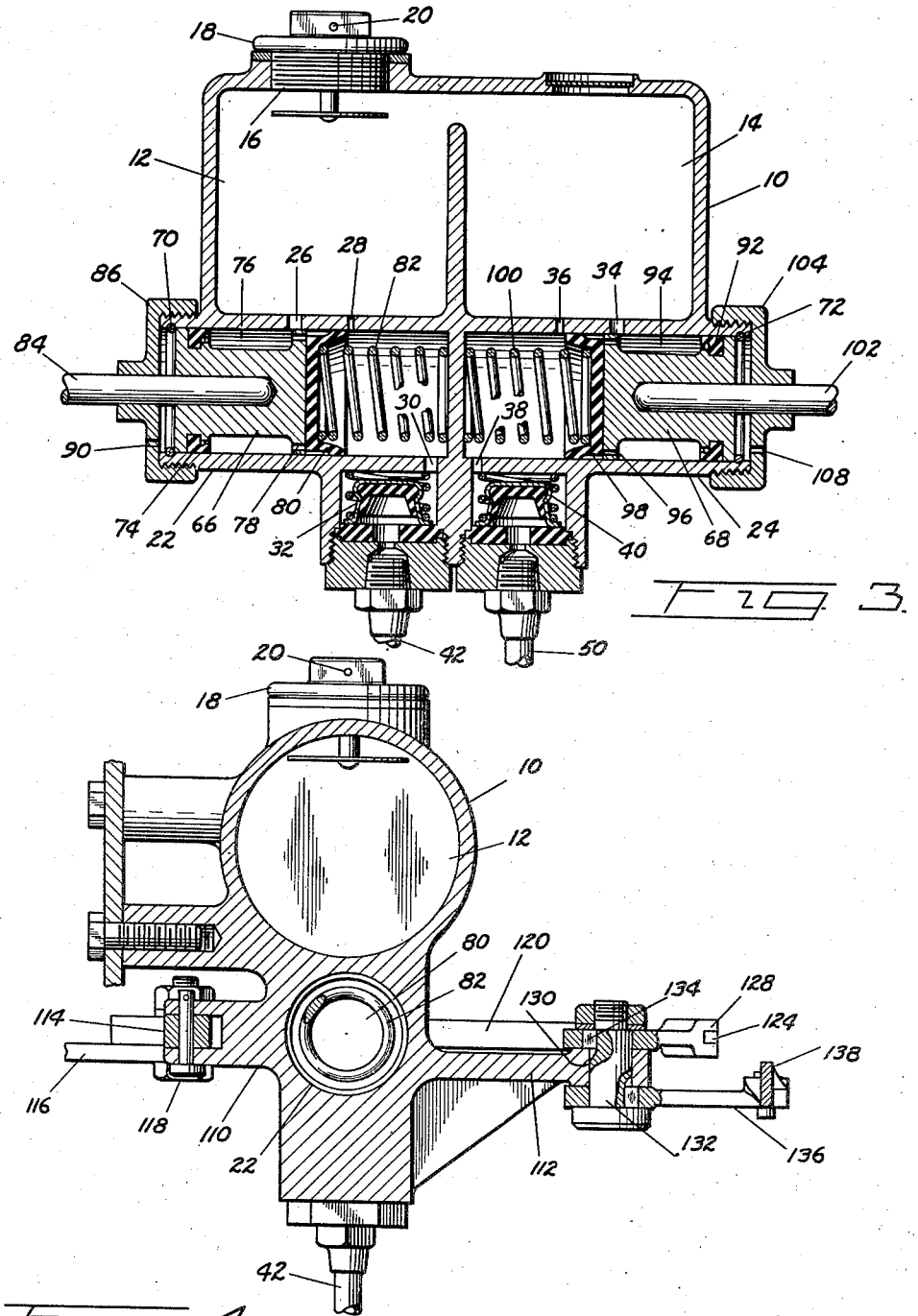
INVENTOR.
HANS W.L. NOACK
BY
Williams, Bradbury, McCaleb & Hinkle.
ATTORNEYS Patented Apr. 26, 1938

2,115,558

UNITED STATES PATENT OFFICE 2,115,558

FLUID PRESSURE BRAKE SYSTEM

Hans W. L. Noack, Detroit, Mich., assignor to Hydraulic Brake Company, Detroit, Mich., a corporation of California Application February 24, 1936, Serial No. 65,292

6 Claims. (Cl. 188—152)

This invention relates to brake systems for motor vehicles.

An object of the invention is to provide a brake system for motor vehicles including two separate systems having a single operating means for actuating the systems concomitantly.

An object of the invention is to provide a fluid pressure braking system for motor vehicles including two separate systems, one of which effects a greater pressure than the other.

Another object of the invention is to provide a fluid pressure braking system for motor vehicles including two separate systems, one effecting a greater pressure than the other, and means for varying the differential in pressures.

Another object of the invention is to provide a brake system for motor vehicles including two separate systems, one for actuating the brakes associated with the front wheels of the vehicle and another for actuating the brakes associated with the rear wheels of the vehicle, and to so couple the systems that a single operating means may effectively actuate the systems concomitantly with perfect equalization between them, and to effectively operate at least one of the systems in the event of failure of the other.

Other objects and advantages will appear from the following description taken in connection with the drawings forming a part of this specification, and in which,—

Fig. 1 is a schematic view of a brake system embodying the invention;

Fig. 2 is a longitudinal, sectional view of the fluid pressure producing device;

Fig. 3 is a vertical, sectional view of the fluid pressure producing device; and Fig. 4 is a sectional view substantially on line 4—4, Fig. 2.

Referring to the drawings for more specific details of the invention, 10 represents a fluid reservoir having two chambers 12 and 14 and a filling opening 16 which may be closed as by a plug 18 having openings 20 for venting the reservoir to the atmosphere.

A pair of cylinders 22 and 24 are arranged head to head at the base of the reservoir. The cylinder 22 has ports 26 and 28, providing communications between the cylinder and the chamber 12 of the reservoir, and a discharge port 30 controlled as by a two-way valve 32. Correspondingly, the cylinder 24 has ports 34 and 36, providing communications between the cylinder and the chamber 14 of the reservoir, and a discharge port 38 controlled as by a two-way valve 40.

A fluid pressure delivery pipe or conduit 42 connected to the valve 32 has branches 44 and 46 connected respectively to fluid pressure actuated motors 48; and a corresponding fluid pressure delivery pipe or conduit 50 has branches 52 and 54 connected respectively to fluid pressure actuated motors 56. The motors 48 and 56 are arranged in pairs, one pair for actuating the braking elements of the brakes associated with the front wheels of the vehicle, and another pair for actuating the braking elements of the brakes associated with the rear wheels of the vehicle.

The brakes may be of conventional type including a fixed support or backing plate 58, a rotatable drum 60 associated therewith, corresponding interchangeable friction elements or shoes 62 pivoted on the backing plate, and a motor corresponding to the motors 48 and 56 mounted on the backing plate between the separable ends of the shoes and operative to spread the shoes into engagement with the drum against the resistance of a retractile spring 64.

Pistons 66 and 68, reciprocable in the cylinders 22 and 24, are held against displacement by retaining rings 70 and 72 seated in continuous grooves in the walls of the cylinders adjacent their outer ends. The skirt of the piston 66 carries a leak-proof cup 74, which inhibits the seepage of fluid from the cylinder past the piston. The body of the piston has a reduced section providing in conjunction with the wall of the cylinder an annular chamber 76 communicating with the chamber 12 of the reservoir by way of the port 26; and the head of the piston has a plurality of spaced ports 78 providing communications between the annular chamber 76 and that portion of the cylinder 22 forward of the piston.

A collapsible leak-proof cup 80 seated on the head of the piston controls the ports 78, and a spring 82 interposed between the cup and the head of the cylinder retains the cup in position and also serves to return the piston to its retracted position. The piston has a recess in its back receiving one end of a thrust pin 84, extending through a head 86 threaded on the outer end of the cylinder, and is provided on its other end with an eye 88; and the head is provided with an opening 90 for venting the cylinder to the atmosphere.

Correspondingly, the skirt of the piston 68 carries a leak-proof washer 92 which inhibits seepage of fluid from the cylinder past the piston. The body of the piston has a reduced section providing in conjunction with the wall of the cylinder an annular chamber 94 communicating with the chamber 14 of the reservoir by way of the port 34;

and the head of the piston has a plurality of spaced ports 96 providing communications between the annular chamber 94 and that portion of the cylinder forward of the piston.

A collapsible leak-proof cup 98 seated on the head of the piston controls the ports 96, and a spring 100 interposed between the cup and the head of the piston retains the cup against displacement and also serves to return the piston to its retracted position. The piston has a recess in its back receiving one end of a thrust rod 102 extending through a head 104 threaded on the outer end of the cylinder, and is provided on its other end with an eye 106, and the head has an opening 108 for venting the cylinder to the atmosphere.

Diametrically disposed supports or brackets 110 and 112 are formed on the walls of the cylinders 22 and 24. The support 110 has pivoted thereon a rocker rod 114, one end of which is adjustably secured to a fixed support 116 as at 118. Levers 120 and 122, pivotally mounted on the rod 114, extend respectively through the respective eyes 88 and 106 of the thrust pins 84 and 102, and these levers are respectively connected by links 124 and 126 to the respective ends of a walking beam 128. A slot 130 elongated in a direction parallel to the cylinders 22 and 24, is provided in the support or bracket 112. A shaft 132 is rotatably and slidably mounted in the slot 130. The walking beam 128 is secured to the shaft as by a key 134. An arm 136 keyed or otherwise secured to the stub shaft 132 is connected by a rod 138 to a foot pedal lever 140 pivotally mounted on a shaft 142 and connected by a retractile spring 144 to a fixed support.

By adjusting the rocker rod 114 the leverage of the levers 120 and 122 with respect to the thrust rods 84 and 102 may be changed to vary the pressures in the respective pairs of fluid pressure actuated motors 48 and 56. Such variation is frequently desirable to the end that the brakes associated with the wheels of the vehicle may be regulated as to their relative effectiveness.

In operation, upon depressing the foot pedal lever 140, force is transmitted therefrom through the rod 138 and the arm 136 to the stub shaft 132, resulting in rocking the shaft. This movement of the shaft 132 is transmitted to the walking beam 128 with the result that force is applied through the links 124 and 126 to the levers 120 and 122 to rock these levers on the rod 114. This movement of the levers is transmitted through the thrust pins 84 and 102 to the pistons 66 and 68, resulting in moving the pistons on their compression strokes. As the pistons 66 and 68 move on their compression strokes, fluid is displaced from the cylinders 22 and 24, through the discharge ports 30 and 38, past the two-way valves 32 and 40, and through the fluid pressure delivery pipes 42 and 50, into the fluid pressure actuated motors 48 and 56, causing actuation of these motors with the resultant spreading of the shoes 62 into engagement with the drums 60 against the resistance of the retractile springs 64. In instances where there is a differential in the adjustment of the respective pairs of brakes, upon the initial movement of the pistons 66 and 68, the walking beam 128 shifts in the slot 130 so as to equalize the force transmitted from the walking beam through the links 124 and 126 to the respective levers 120 and 122.

Upon release of the foot pedal lever 140, the retractile spring 144 becomes effective to return the lever to its retracted position. As the lever returns to its retracted position, the rod 138 is retracted and the arm 136 is moved through an arc, resulting in rocking the shaft 132 in the reverse direction. This movement of the shaft is transmitted through the walking beam 128, and from the walking beam through the links 124 and 126 to the levers 120 and 122, to rock the levers on the rod 114, and this movement of the levers 120 and 122 retracts the thrust pins 84 and 102, resulting in releasing the pistons 66 and 68.

Upon release of the pistons, they are returned to their retracted positions under the influence of the springs 82 and 100. As the pistons return to their retracted positions, fluid is drawn from the respective chambers 12 and 14 of the reservoir, through ports 26 and 34, into the annular chambers 76 and 94, through the ports in the heads of the respective pistons, past the leakproof cups 80 and 98, into the cylinders 22 and 24 forward of the heads of the pistons. During this period fluid is returning to the cylinders from the motors 48 and 56 under the influence of the retractile springs 64. Should the quantity of fluid received by the cylinders be in excess of the quantity required to completely fill the cylinders, all excess fluid is returned to the respective chambers of the reservoir through the ports 28 and 36. At the end of this operation the system is again in the position of rest.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim as new and desire to secure by Letters Patent is,—

1. A fluid pressure system comprising a compressor having opposed cylinders, a piston reciprocable in each cylinder, a rockable support, levers pivoted on the support, means connecting the respective levers to the respective pistons, and means for operating the levers concomitantly to discharge fluid under pressure from said cylinders.

2. A fluid pressure system comprising a compressor having opposed cylinders, a piston reciprocable in each cylinder, a rockable support, means for retaining the support in a fixed position, levers pivoted on the support, means connecting the respective levers to the respective pistons, and means for operating the levers in unison to discharge fluid under pressure from said cylinders.

3. A fluid pressure system comprising opposed cylinders, a piston reciprocable in each cylinder, a rockable support, means for retaining the support in a fixed position, levers pivoted on the support, means connecting the levers to the pistons, a walking beam, means for rocking the walking beam, and means connecting the respective levers to the respective ends of the walking beam.

4. A fluid pressure braking system comprising a pair of cylinders arranged head to head, a piston reciprocable in each cylinder, a rockable support, means for securing the support against movement, levers pivoted on the support, rods connecting the respective levers to the respective pistons, a fixed support, a walking beam slidable and rockable thereon, means for rocking the walking beam, and links connecting the respective levers to the respective ends of the walking beam.

5. A fluid pressure braking system comprising a pair of cylinders arranged head to head, fluid pressure actuated motors connected to the cylinders, brakes actuated by the motors, a piston reciprocable in each cylinder, a rockable support, means for securing the support against movement, levers pivoted on the support, rods connecting the respective levers to the respective pistons, a walking beam, links connecting the respective levers to the respective ends of the walking beam, means permitting bodily movement of the walking beam to compensate for variation in adjustment of the brakes, and means for actuating the walking beam.

6. A fluid pressure braking system comprising a reservoir having two compartments, a pair of cylinders arranged head to head, each cylinder communicating with a compartment, fluid pressure actuated motors connected to each of the cylinders, brakes actuated by the motors, a piston reciprocable in each cylinder, diametrically opposed brackets arranged centrally of the cylinders, a rockable support pivoted on one of the brackets, levers pivoted on the support, rods connecting the respective levers to the respective pistons, a walking beam slidable on the other bracket to compensate for variations in the adjustment of the brakes, links connecting the respective levers to the respective ends of the walking beam, and means for rocking the walking beam.

HANS W. L. NOACK.